June 10, 1941.  H. D. PHILIPS ET AL  2,245,158
FOCUSING MECHANISM FOR PHOTOGRAPHIC CAMERAS
Filed Sept. 7, 1939  2 Sheets-Sheet 1
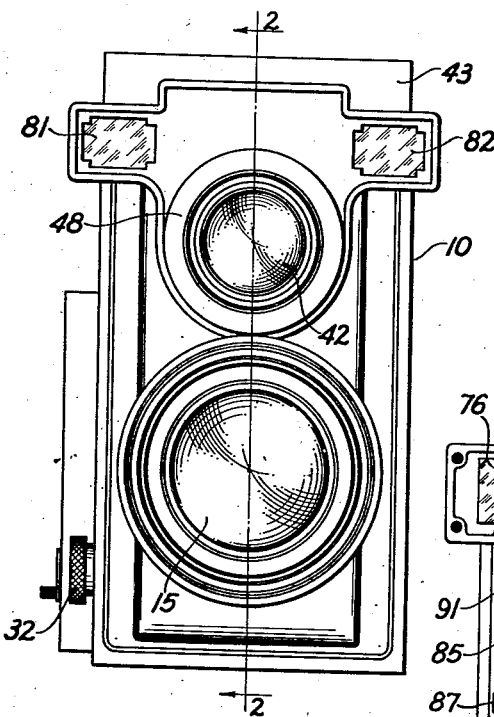
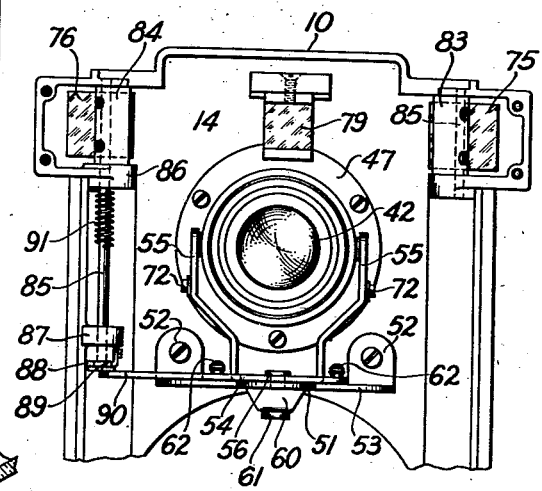
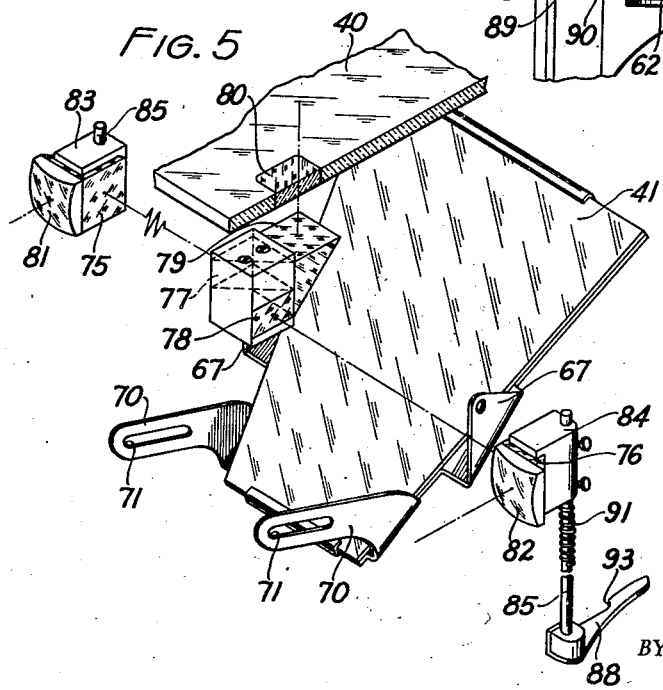
HARLOW D. PHILIPS
JOSEPH MIHALYI
INVENTORS
BY
ATTORNEYS June 10, 1941.  H. D. PHILIPS ET AL  2,245,158
FOCUSING MECHANISM FOR PHOTOGRAPHIC CAMERAS
Filed Sept. 7, 1939  2 Sheets-Sheet 2
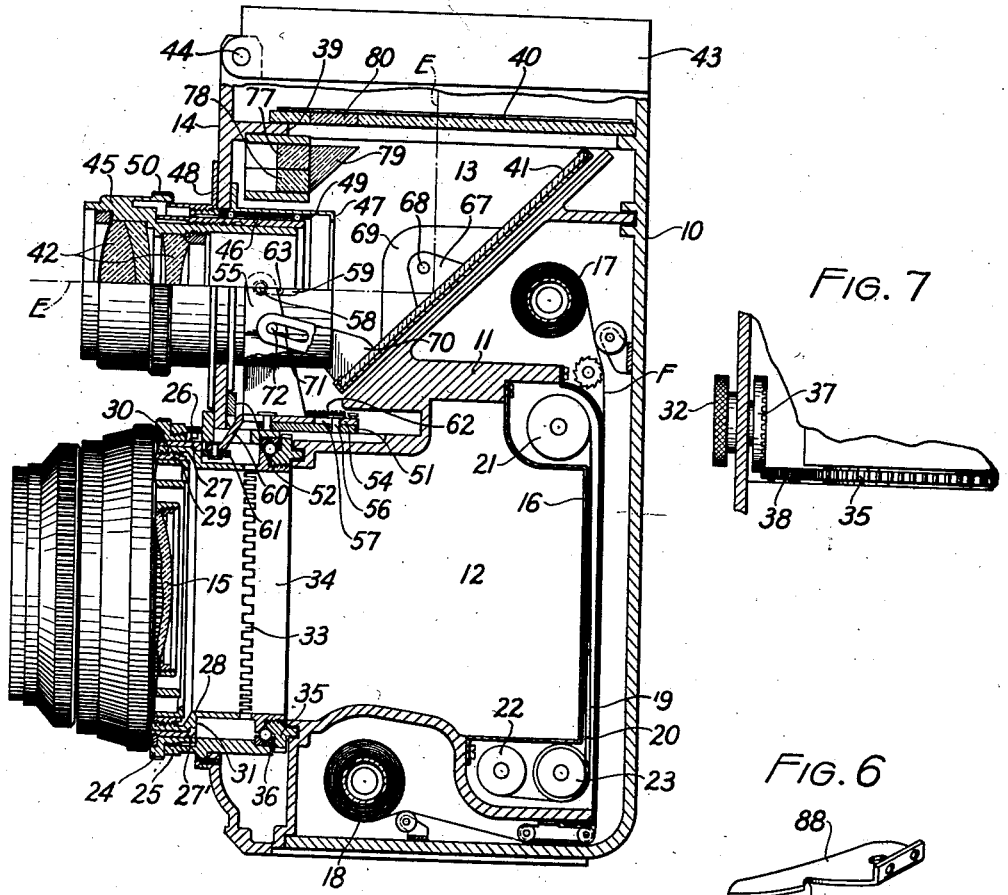
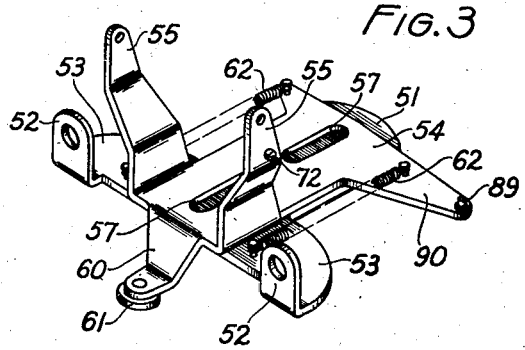
HARLOW D. PHILIPS
JOSEPH MIHALYI
INVENTORS
BY
ATTORNEYS Patented June 10, 1941

2,245,158

UNITED STATES PATENT OFFICE 2,245,158

FOCUSING MECHANISM FOR PHOTOGRAPHIC CAMERAS

Harlow D. Philips and Joseph Mihalyi, Rochester, N. Y., assignors to Eastman Kodak Company, Rochester, N. Y., a corporation of New Jersey Application September 7, 1939, Serial No. 293,782

16 Claims. (Cl. 95—44)

The present invention relates to photographic cameras of the type comprising a focusing finder of the reflex type disposed laterally, or above, the exposure lens, and having its mirror tiltably mounted so that the inclination of the same relative to the axis of the finder lens can be altered to compensate for parallax, and a range finder including a movable optical element; and particularly to the focusing mechanism of a camera whereby the finder lens is adapted to be focused, the mirror tilted to compensate for parallax, and the range finder adjusted, all simultaneously with and by a focusing of the exposure lens.

One object of the present invention is to provide a camera of the type referred to in which the finder lens is shifted axially for focusing purposes simultaneously with the exposure lens and by the focusing member of said exposure lens.

Another object is to pivotally mount the finder mirror so that its inclination relative to the axis of the finder lens can be changed to compensate for parallax.

And yet another object is to provide means whereby the tilt of the mirror will be automatically altered to compensate for parallax simultaneously with a focusing of the exposure lens and by the movement of the focusing member of said exposure lens.

And a further object is to provide a camera of the type described in which the means for focusing the finder lens and a means for altering the tilt of the mirror include a member common to both, and which member is adapted to be moved by the focusing member of the exposure lens when the same is moved during focusing of said exposure lens.

And another object is to provide a camera of the type described with a range finder the movable element of which is adapted to be adjusted simultaneously with and by the focusing member of the exposure lens.

And a still further object is to provide means for adjusting said movable element of the range finder, whereby the range finder will be adjusted simultaneously with a focusing of the exposure lens and in accordance with the focal length of said lens.

And another object is to provide a focusing mechanism for a camera of the type described on which the means of focusing said finder lens, the means for altering the tilt of said mirror, and the means for adjusting the range finder, include a member common to all three, and which member is adapted to be moved by the focusing member of the exposure lens when the same is moved for the focusing of said lens.

And a further object is to provide means for adjusting each of the finder lens, the mirror, and the range finder, from the focusing member of the exposure lens, which means includes the least number of parts so that it is simple and compact, but which means is still efficient and accurate in operation.

The novel features that we consider characteristic of our invention are set forth with particularity in the appended claims. The invention itself, however, both as to its organization, together with additional objects and advantages thereof, will best be understood from the following description of a specific embodiment when read in connection with the accompanying drawings in which, Fig. 1 is a front elevation showing a camera of the type embodying the present invention, Fig. 2 is an enlarged section taken substantially on line 2—2 of Fig. 1, and showing the present invention, Fig. 3 is an enlarged perspective of the motion transmitting member adapted to be operated by the focusing member for the exposure lens, and which member is connected to the focusing finder lens, the tiltable mirror, and the movable member of the range finder so that movement of the same by said focusing member is adapted to adjust each of the listed parts simultaneously with a focusing of the exposure lens, Fig. 4 is an elevation of the upper part of the front of the camera, and taken from the rear of the finder lens and just ahead of the finder mirror to show the connection between the motion transmitting member, shown in Fig. 3, and a movable element of the range finder, Fig. 5 is an enlarged perspective showing the relation of the optical elements of the range finder with respect to the optical parts of the reflex finder, whereby the image plane of the range finder is adapted to be located in the ground glass of this finder adjacent the image formed by the finder lens.

Fig. 6 is a perspective of the lever connected to the movable optical element of the range finder and engaging the motion-transmitting member, and showing the form of said lever, and Fig. 7 is a detail of the lower right-hand front corner of the camera, looking at Fig. 1, with the camera wall broken away to show the arrangement whereby the focusing member for the exposure lens can be rotated by a focusing knob on the side of the camera instead of by gripping the member itself.

Like reference characters refer to corresponding parts through the drawings.

Referring now to Figs. 1 and 2, the camera may be of the twin lens type comprising a hollow body portion 10, divided by an irregular partition, indicated generally at 11, into an exposure chamber 12 and a finder chamber 13. On the front wall 14 of the camera body, and in alignment with the exposure chamber 12, is mounted a focusing exposure lens 15 to be described more fully hereinafter. The image formed by the exposure lens is adapted to be projected onto a sensitive film F movable across the exposure frame 16 from the supply roll 17 to the take-up roll 18 when such take-up roll is rotated by a winding member on the outside of the camera, not shown. The speed of exposure of the film may be controlled by any suitable form of focal plane shutter comprising curtains 19 and 20 adapted to be wound up on rollers 21 and wound off upon individual rollers 22 and 23.

The exposure lens may be carried by a focusing mount of the type completely described in pending patent application Serial No. 219,178, Joseph Mihalyi, filed July 14, 1938, which matured into Patent No. 2,186,616 on January 9, 1940, to which reference can be had for a detailed description of the same. Since this mount per se forms no part of the present invention it will suffice to say that it is one of the focusing type and adapted to be interchangeably mounted on the camera. This lens mount may include a rotatable threaded adapter ring 24 which is adapted to threadedly engage an internally threaded ring 25 carried by the front of the camera. The rotative position of the mount when placed on the camera may be determined by a pin 26 extending radially of the ring 25 on the camera which is adapted to slide into a longitudinally extending slot 27 in the rear end of the tube 27' forming a fixed part of the mount.

The mount for the exposure lens includes a rotatable focusing ring 28 into which the carrier 29 for the exposure lenses may be threaded, as indicated at 30, to be moved axially for focusing purposes by a rotation of the focusing ring. The focusing ring 28 extends rearwardly of the mount and includes an off-set shoulder 31 which takes the form of a longitudinal cam which serves, as will hereinafter be described, to transmit motion to the range finder, focusing finder lens, and the tiltable finder mirror thru a single motion-transmitting member, when the focusing ring is rotated to focus the exposure lens. So that the focusing ring can be rotated from a focusing knob 32 mounted on the side of the camera, the rear end of the focusing ring is provided with gear teeth 33 which are adapted to mesh with the teeth of a crown gear 34 when the lens mount is placed on the camera. Crown gear 34 is threaded to a spur gear 35, the two riding on a ball race 36 within the camera to make them freely rotatable, and the spur gear 35 is geared to a crown gear 37 connected to the focusing knob 32 through a pinion 38, see Figs. 2 and 7.

Horizontally disposed over an opening 39 in the top of the finder chamber 13 is a ground glass 40 and onto which an image of the subject to be photographed is adapted to be reflected from the inclined mirror 41 and to which said image is projected by a focusing finder lens 42 mounted in the front wall 14 of the camera body 10 and disposed vertically above the exposure lens. When the camera is not in use the ground glass may be covered by a suitable cover 43 pivoted at 44 to the top front corner of the camera body. The finder lens mount may comprise a carrier 45 in which the lens elements are mounted, and which carrier is threaded into a sleeve 46 which is slidably, but not rotatably, mounted relative to a guide tube 47 threaded into an internally threaded flange ring 48 on the front wall 14 of the camera body. For a given range of focus, for example infinity to 3½ feet, focusing of the finder lens can be accomplished by an axial sliding movement of the sleeve 46 and carrier 48 relative to the guide tube 47, and a ball race 49 is situated between the guide tube and sleeve to facilitate such a sliding movement. To focus the finder lens closer than 3½ feet the carrier 45 may be grasped by the knurled ring 50 and rotated relative to the sleeve 46.

So that the finder lens will be focused simultaneously with, and by, the focusing of the exposure lens, the following strucure is provided. A supporting plate 51, of the form most clearly shown in Fig. 3, is fastened to the inside face of the front wall 14 of the camera body between the finder lens and exposure lens by means of bolts, not shown, passing through perforated gears 52 struck up from arms 53 extending laterally of the plate proper, and which plate extends rearwardly of the camera body as best shown in Fig. 2. A motion-transmitting member in the form of a sliding carriage 54 having upstanding spaced arms 55 on its forward end is slidably mounted on a supporting plate by a headed pin 56 on said plate engaging an elongated slot 57 in the carriage. The upstanding arms 55 of the carriage are arranged to extend on each side of the finder lens and are perforated to engage pins 58 connected to the sleeve 46 of the finder lens mount and extending thru an elongated slot 59 in the guide tube 47.

It will be understood that movement of the carriage 54 along the plate 51 will cause the sleeve 46, and along with it the lens carrier 45, to be shifted axially for focusing purposes. Movement of the carriage by the focusing member is effected by having the arm 60 extending forwardly and downwardly from the carriage and including a roller 61 engaging the longitudinal cam 31 on the focusing ring 28 of the exposure lens mount. This arm is normally maintained in engagement with this cam through the action of a pair of springs 62 connected at one end to the carriage and at the other end to the laterally extending arms of the supporting plate 51 so as to normally urge such carriage in a direction toward the front of the camera. It will be readily understood by those skilled in the art that when the focusing ring 28 is rotated to focus the exposure lens that the cam 31 thereon will shift the carriage 54 to focus the finder lens simultaneously with a focusing of the exposure lens. It will be appreciated that the contour of the cam 31 on the focusing ring will be such that the movement of the carriage 54 effected thereby will be such as to cause a proper focusing of the finder lens in accordance with the focal length of the exposure lens. It will be noticed that the pins 58 are connected to the sleeve 46 and extend through short slots 63 in the ball race 49 of the finder lens mount as well as thru the slot 59 in the guide tube 47. The short slot 63 in the ball race is provided to insure against the possibility of axial movement of the pins 58 along with the sleeve 46 from directly engaging and moving the ball race should such sleeve tend to move a distance greater than the ball race during a focusing of the finder lens.

Usually in cameras of the twin lens type parallax is automatically compensated for during a focusing of the lenses by tilting the finder lens relative to the exposure lens so that their optical axes intersect in the plane of the subject. In the present instance, however, parallax is prevented during focusing by adjusting the inclination of the finder mirror relative to the optical axis of the finder lens so as to hold the reflected beam E of the finder lens always in the center of the field of the ground glass 40. To accomplish this the mirror 41 is pivotally mounted in the finder chamber 13 by having perforated ears 67 extending from each of two parallel supporting frames 69 forming a part of the partition 11. To the lower free end of the mirror are fastened a pair of levers 70 which extend forwardly and each of which have an elongated slot 71 adapted to engage a pin 72 extending laterally from each upstanding arm 55 of the carriage 54. It will be noticed that the ends of the levers 70, as well as the slot 71 therein, engaging the pin 72 are slightly inclined relative to the direction of movement of the carriage.

By this arrangement when the carriage is slid forwardly and rearwardly during focusing of the exposure and finder lenses, the mirror will be automatically subjected to a slight tilting to correct, or prevent, parallax. When the two lenses are focused at infinity the carriage 54 will be moved inwardly as far as it will go, and the mirror will be raised by virtue of the pin 72 engaging slot 71 inclined relative to the direction of movement of said pin. The inclination of the slot 71 relative to the direction of movement of pin 72 on the carriage is such that when focusing on short distances the mirror 41 will be caused to tilt downwardly so that with two optical axes parallel to each other when focused for infinity, or with the finder axis converging on the axis of the exposure lens for short distances, the mirror is tilted to hold a reflected beam E always in the center of field-limiting frame of the ground glass. It will be appreciated that by arranging the mirror to be tilted by movement of the carriage 54, which carriage transmits focusing movement to the finder lens by a rotation of the focusing ring 28, that parallax is adapted to be automatically and simultaneously prevented with a focusing movement of the exposure lens and the finder lens by the least number of parts.

It being difficult in some instances to secure the best focus with a reflex finder of the type described, we prefer, in accordance with the present invention, to provide the camera with a range finder to supplement the focusing reflex finder. As shown in Figs. 1, 2, 4 and 5, this finder may comprise two laterally spaced beam-accepting members, here shown as prisms 75 and 76, which direct the accepted beams along the base line to two collimating prisms 77 and 78 from which they are directed onto another prism 79 which reflects them onto a clear area 80 provided in the ground glass 40 and adjacent to front edge thereof. Located in the two range finder beams are lenses 81 and 82 which are adapted to form images in the prism 79, and which images are reflected by such prisms onto the clear area 80 of the ground glass. In the present instance the lenses 81 and 82 are shown attached directly to the beam-receiving face of the prisms 75 and 76, but it is to be understood that they may be positioned at any suitable point in beams entering, or projected by, such prisms so long as they are of proper focal length to form an image at the reflecting prism 79.

One of the beam-accepting members, i. e. 75, is carried by a frame 83 to be stationarily mounted in the camera body 10. The other beam-accepting member 76 is mounted in a frame 84 which is mounted on a rod 85 rotatably mounted in bearings 86 and 87 in the camera body so that said beam-accepting member can be rotated laterally of the other beam-accepting member to shift the range finder in acordance with the distance of the subject to be photographed. For coupling the adjustable beam-accepting member 76 of the range finder to the focusing movement of the exposure lens the lower end of the rod 85 is provided with a cam-ended lever 88 which is adapted to engage a pin 89 extending vertically of the projecting arm 90 on the carriage 54, see Figs. 3, 4 and 5. This cam-ended lever is normally held in engagement with the pin 89 by the action of a coil spring 91 surrounding said rod and having one end fastened thereto while the other end engages the camera body, see Figs. 4 and 5. The cam on the end of the lever 88 is so formed that the straight-line movement of the pin 89, caused by a sliding of the carriage 54, will effect a rotation of the beam-accepting member 76 in the proper direction, and by a proper amount, relative to the other beam-accepting member to adjust the range finder in accordance with the distance for which the exposure lens is focused, see Fig. 6. It will be appreciated by those skilled in the art that the cam surface on the end of the lever 88 must be formed so as to give the correct adjustment of the member 76 in combination with the contour of the cam 31 on the focusing ring 28 which effects the sliding movement of the carriage 54 when rotated to focus the exposure lens.

Inasmuch as a range finder cannot be depended upon to accurately indicate a distance less than 3½ feet when moved by the focusing member of a lens mount, it is desirable to give some visible indication to warn the operator when he is attempting to rely on the range finder for focusing at a distance less than 3½ feet. To accomplish this result, the pin engaging surface of the cam-ended lever 88 may be provided with a sharp break, indicated at 93, located at, or just beyond, the point of the cam surface adapted to engage the pin 89 when the exposure lens is focused at a distance of 3½ feet. Now, if the operator starts to inadvertently focus on an object say at a 3 foot distance by using the range finder, the pin 89 will move forwardly of the camera body and along the cam surface of the cam-ended lever 88 and the images of the two beam-accepting members will be gradually moved toward an aligning position until the pin drops into the break 93 in the cam surface. At this time the rod 85 under the action of coil spring 91 will instantly rotate the beam-accepting member 76 by an appreciable amount, whereby the images of the two members 75 and 76 will be thrown way out of alignment, and when this happens, the operator will be warned that he is focusing at a distance less than 3½ feet and beyond the accurate range of the range finder. To focus at distances less than 3½ feet accurately, the distance should be accurately measured by a tape, or the like, and the exposure lens focused by hand according to such measurement.

Although we have shown and described certain specific embodiments of our invention, we are fully aware that many modifications thereof are possible. Our invention, therefore, is not to be restricted except insofar as is necessitated by the prior art and the spirit of the appended claims.

Having thus described our invention what we claim is new and desire to secure by Letters Patent of the United States is:

1. In a photographic camera the combination of a focusable exposure lens, a reflex finder including a ground glass, a tiltable inclined mirror, and a focusable finder lens adapted to project an image of the subject to be photographed onto said mirror, means for focusing said exposure lens and said finder lens simultaneously upon the subject to be photographed, and means connected to said mirror and operated by said last mentioned means adapted to tilt said mirror relative to said finder lens and in a direction to prevent parallax.

2. In a photographic camera the combination of a focusable exposure lens, a reflex finder including a ground glass, a tiltable inclined mirror, and a focusable finder lens adapted to project an image of the subject to be photographed onto said mirror, a focusing member for focusing said exposure lens, means connected to said finder lens and actuated by movement of said focusing member whereby said finder lens is adapted to be focused by movement of said focusing member simultaneously with said exposure lens, and means connected to said mirror and said last mentioned means adapted to tilt said mirror relative to said finder lens and in a direction to prevent parallax.

3. In a photographic camera the combination of a focusable exposure lens, a reflex finder including a ground glass, a tiltable inclined mirror, and a focusable finder lens adapted to project an image of the subject to be photographed onto said mirror, a focusing member for focusing said exposure lens, a movable member connected to said finder lens to focus the same when moved, said movable member adapted to be engaged and moved by said focusing member whereby the finder lens is adapted to be focused by said focusing member simultaneously with a focusing of said exposure lens, and means connecting said mirror to said movable member adapted to tilt said mirror relative to said finder lens and in a direction to prevent parallax.

4. In a photographic camera the combination of a focusable exposure lens, a reflex finder including a ground glass, a tiltable inclined mirror, and a focusable finder lens adapted to project an image of the subject to be photographed onto said mirror, a focusing member for focusing said exposure lens, a member movable axially of said finder lens and connected thereto for focusing the same when moved, means for connecting said member to said focusing member whereby it is adapted to be moved by adjustment of said focusing member to focus said finder lens simultaneously with said exposure lens, said means including a cam on said focusing member, and a spring normally urging said member into engagement with said cam, and means connecting said mirror to said member adapted to tilt said mirror relative to said finder lens and in a direction to prevent parallax.

5. In a photographic camera the combination of a focusable exposure lens, a reflex finder including a ground glass, a tiltable inclined mirror, and a focusable finder lens adapted to project an image of the subject to be photographed onto said mirror, a focusing member for focusing said exposure lens, a movable member connected to said finder lens to focus the same when moved, said movable member adapted to be engaged and moved by said focusing member whereby the finder lens is adapted to be focused by said focusing member simultaneously with a focusing of said exposure lens, and means connecting said mirror to said movable member adapted to tilt said mirror relative to said finder lens and in direction to prevent parallax, said means comprising a pin connected to said movable member, and an arm connected to the free end of said mirror provided with a slot engaging said pin, said slot arranged at an angle to the direction of movement of said movable member.

6. In a photographic camera the combination of a camera body, a focusable exposure lens on said camera body, a reflex finder on said camera body including a ground glass, a tiltable mirror, and a focusable finder lens having its axis parallel to the axis of said exposure lens but spaced therefrom, a rotatable focusing ring coaxial with said exposure lens and connected thereto for focusing the same, said focusing ring extending into said camera body and including an axial cam, a motion transmitting member mounted in said camera body to slide axially of said lenses, and connected to said finder lens to focus the same when moved, a cam follower connected to said motion transmitting member adapted to engage said cam on the focusing ring whereby said member is adapted to be slid by rotation of said focusing ring, means normally urging said motion transmitting member in a direction to force said follower against said cam, and means connected to said mirror and said motion transmitting member adapted to tilt said mirror relative to said finder lens and in a direction to prevent parallax.

7. In a photographic camera the combination of a camera body, a focusable exposure lens on said camera body, a reflex finder on said camera body including a ground glass, a tiltable mirror, and a focusable finder lens having its axis parallel to the axis of said exposure lens but spaced therefrom, a rotatable focusing ring coaxial with said exposure lens and connected thereto for focusing the same, said focusing ring extending into said camera body and including an axial cam, a motion transmitting member mounted in said camera body to slide axially of said lenses, and connected to said finder lens to focus the same when moved, a cam follower connected to said motion transmitting member adapted to engage said cam on the focusing ring whereby said member is adapted to be slid by rotation of said focusing ring, means normally urging said motion transmitting member in a direction to force said follower against said cam, and means connected to said mirror and said motion transmitting member adapted to tilt said mirror in a direction to prevent parallax, said means comprising a cam and cam follower connection between said motion transmitting member and the free end of said mirror whereby a sliding movement of motion transmitting member is adapted to tilt said mirror.

8. In a photographic camera the combination of a camera body, a focusable exposure lens on said camera body, a reflex finder on said camera body including a ground glass, a tiltable mirror, and a focusable finder lens having its axis parallel to the axis of said exposure lens but spaced therefrom, a rotatable focusing ring coaxial with said exposure lens and connected thereto for focusing the same, said focusing ring extending into said camera body and including an axial cam, a motion transmitting member mounted in said camera body to slide axially of said lenses, and connected to said finder lens to focus the same when moved, a cam follower connected to said motion transmitting member adapted to engage said cam on the focusing ring whereby said member is adapted to be slid by rotation of said focusing ring, means normally urging said motion transmitting member in a direction to force said follower against said cam, and means connected to said mirror and said motion transmitting member adapted to tilt said mirror in a direction to prevent parallax, said means comprising a pin on said motion transmitting member, and an arm connected to the free end of said mirror having a pin engaging surface inclined to the direction of movement of said motion transmitting member and normally engaging said pin.

9. In a photographic camera the combination of a camera body, a focusable exposure lens on said camera body, a reflex finder on said camera body including a ground glass, a tiltable mirror, and a focusable finder lens having its axis parallel to the axis of said exposure lens but spaced therefrom, a rotatable focusing ring coaxial with said exposure lens and connected thereto for focusing the same, said focusing ring extending into said camera body and including an axial cam, a motion transmitting member mounted in said camera body to slide axially of said lenses, and connected to said finder lens to focus the same when moved, a cam follower connected to said motion transmitting member adapted to engage said cam on the focusing ring whereby said member is adapted to be slid by rotation of said focusing ring, means normally urging said motion transmitting member in a direction to force said follower against said cam, and means connected to said mirror and said motion transmitting member adapted to tilt said mirror in a direction to prevent parallax, said means comprising a pin on said motion transmitting member, and a bracket connected to the free end of said mirror and provided with a slot engaging said pin, said slot inclined to the direction of movement of said motion transmitting member.

10. In a photographic camera the combination of a camera body, a focusable exposure lens, a reflex finder comprising a ground glass, a tiltable inclined mirror, and a focusable finder lens adapted to project an image of the subject to be photographed onto said mirror, a range finder in said camera body including a movable optical element, a focusing ring for focusing the exposure lens, and means for focusing said finder lens, tilting said mirror relative to said finder lens to prevent parallax, and adjusting said movable optical element all in accordance, and simultaneously, with a focusing of said exposure lens, said means adapted to be actuated by movement of said focusing ring.

11. In a photographic camera the combination of a camera body, a focusable exposure lens, a reflex finder comprising a ground glass, a tiltable inclined mirror, and a focusable finder lens adapted to project an image of the subject to be photographed onto said mirror, a range finder in said camera body including a movable optical element, a focusing ring for focusing the exposure lens, and means for focusing said finder lens, tilting said mirror to prevent parallax, and adjusting said movable optical element all in accordance, and simultaneously, with a focusing of said exposure lens, said means including a motion transmitting member slidably mounted in said camera body and operatively connected to said finder lens, said mirror, and movable optical element to adjust each of the same when slid, and connecting means for operatively connecting said motion transmitting member to said focusing ring whereby the said motion transmitting member is adapted to be slid by movement of said focusing ring in focusing said exposure lens.

12. In a photographic camera the combination of a camera body, a focusable exposure lens, a reflex finder on said camera comprising a ground glass, a focusable finder lens spaced from said exposure lens and having its optical axis parallel to the optical axis of said exposure lens, and an inclined mirror adapted to receive the image of the subject to be photographed projected by said finder lens and reflect the same onto said ground glass, said mirror pivotally mounted in said camera body whereby its inclination relative to the optical axis of the finder lens may be altered to prevent parallax, a range finder in said camera body including a movable optical element, a rotatable focusing ring for focusing said exposure lens, and coaxial with said exposure lens, and means for focusing said finder lens, for adjusting the tilt of said mirror to prevent parallax, and for adjusting said movable optical element all in accordance, and simultaneously, with a focusing of said exposure lens, said means including a motion transmitting member slidably mounted in said camera body to move in a direction parallel to the optical axis of said lenses, and operatively connected to said finder lens, said mirror, and said movable optical element to adjust each of the same when slid, a longitudinal cam on said focusing ring formed in accordance with the focal length of said exposure lens, and operatively connected to said motion transmitting member to slide the same when said focusing ring is rotated to focus said exposure lens.

13. In a photographic camera the combination of a camera body, a focusable exposure lens, a reflex finder on said camera comprising a ground glass, a focusable finder lens spaced from said exposure lens and having its optical axis parallel to the optical axis of said exposure lens, and an inclined mirror adapted to receive the image of the subject to be photographed projected by said finder lens and reflect the same onto said ground glass, said mirror pivotally mounted in said camera body whereby its inclination relative to the optical axis of the finder lens may be altered to prevent parallax, a range finder in said camera body including a movable optical element, a rotatable focusing ring for focusing said exposure lens and coaxial with said exposure lens, and means for focusing said finder lens, for adjusting the tilt of said mirror to prevent parallax, and for adjusting said movable optical element all in accordance, and simultaneously, with a focusing of said exposure lens, said means including a motion transmitting member slidably mounted in said camera body to move in a direction parallel to the optical axis of said lenses and operatively connected to said finder lens, said mirror, and said movable optical element to adjust each of the same when slid, a longitudinal cam on said focusing ring formed in accordance with the focal length of said exposure lens, an arm on said motion transmitting member adapted to engage said cam, and means normally acting on said motion transmitting member to slide the same in a direction to maintain said arm in engagement with said cam.

14. In a photographic camera the combination of a camera body, a focusable exposure lens, a reflex finder on said camera comprising a ground glass, a focusable finder lens spaced from said exposure lens and having its optical axis parallel to the optical axis of said exposure lens, and an inclined mirror adapted to receive the image of the subject to be photographed projected by said finder lens and reflect the same onto said ground glass, said mirror pivotally mounted in said camera body whereby its inclination relative to the optical axis of the finder lens may be altered to prevent parallax, a range finder in said camera body including a movable optical element, a rotatable focusing ring for focusing said exposure lens and coaxial with said exposure lens, and means for focusing said finder lens, for adjusting the tilt of said mirror to prevent parallax, and for adjusting said movable optical element all in accordance, and simultaneously, with a focusing of said exposure lens, said means including a motion transmitting member slidably mounted in said camera body to move in a direction parallel to the optical axis of said lenses, an arm on said motion transmitting member connected to said finder lens and adapted to move said lens along its optical axis for focusing purposes when said motion transmitting member is slid, means for operatively connecting the free end of said mirror to said arm whereby movement of said arm is adapted to alter the tilt of said mirror to prevent parallax, and an extension on said motion transmitting member, means for operatively connecting said movable optical element to said extension whereby movement of said extension is adapted to adjust said optical element relative to the remainder of the range finder optical system, and a longitudinal cam on said focusing ring formed in accordance with the focal length of said exposure lens adapted to engage and slide said motion transmitting member during focusing of the exposure lens.

15. In a photographic camera the combination of a camera body, a focusable exposure lens, a reflex finder on said camera comprising a ground glass, a focusable finder lens spaced from said exposure lens and having its optical axis parallel to the optical axis of said exposure lens, and an inclined mirror adapted to receive the image of the subject to be photographed projected by said finder lens and reflect the same onto said ground glass, said mirror pivotally mounted in said camera body whereby its inclination relative to the optical axis of the finder lens may be altered to prevent parallax, a range finder in said camera body including a movable optical element, a rotatable focusing ring for focusing said exposure lens and coaxial with said exposure lens, and means for focusing said finder lens, for adjusting the tilt of said mirror to prevent parallax, and for adjusting said movable optical element all in accordance, and simultaneously, with a focusing of said exposure lens, said means including a motion transmitting member slidably mounted in said camera body to move in a direction parallel to the optical axis of said lenses, an arm on said motion transmitting member connected to said finder lens and adapted to move said lens along its optical axis for focusing purposes when said motion transmitting member is slid, means for operatively connecting the free end of said mirror to said arm whereby movement of said arm is adapted to alter the tilt of said mirror to prevent parallax, said means including a projection on said arm, a lever connected to a free end of said mirror and including a cam surface inclined to the optical axis of said finder lens, and normally engaging said projection on said arm, and an extension on said motion transmitting member, means for operatively connecting said movable optical element to said extension whereby movement of said motion transmitting member is adapted to adjust said optical element relative to the remainder of the range finder optical system, and a longitudinal cam on said focusing ring formed in accordance with the focal length of said exposure lens adapted to engage and slide said motion transmitting member during focusing of the exposure lens.

16. In a photographic camera, the combination of a camera body, a focusable exposure lens, a base type range finder in said camera body including a pivoted optical element, a focusing ring for focusing said exposure lens, a motion transmitting member slidably mounted in said camera body to move in a direction parallel to the optical axis of said exposure lens, means connecting said optical element to said motion transmitting member whereby movement of said member is adapted to pivot said optical element, said means including a projection on said motion transmitting member and movable over a given path therewith, a lever connected to said pivotal optical element and having a projection engaging surface inclined to the given path of movement of said projection, and normally held in engagement therewith, a longitudinal cam on said focusing ring adapted to engage and slide said motion transmitting member during focusing of the lens, said cam having such a contour that it is adapted to move said motion transmitting member during focusing of the exposure lens to pivot said optical member and adjust said range finder in accordance with the focal length of the exposure lens, and said projection engaging surface provided with an irregularity adapted to effect a sudden and abrupt movement of the optical element when the same is engaged by said projection, said irregularity disposed whereby said abrupt and sudden movement of the optical element occurs at a given point in the focusing of the lens to inform the operator of such arrival.

JOSEPH MIHALYI.
HARLOW D. PHILIPS.